US008028281B2

(12) United States Patent
Bera

(10) Patent No.: US 8,028,281 B2
(45) Date of Patent: *Sep. 27, 2011

(54) RUN-TIME PARALLELIZATION OF LOOPS IN COMPUTER PROGRAMS USING BIT VECTORS

(75) Inventor: Rajendra K. Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/620,586

(22) Filed: Jan. 5, 2007

(65) Prior Publication Data

US 2007/0169061 A1      Jul. 19, 2007

Related U.S. Application Data

(63) Continuation of application No. 10/736,343, filed on Dec. 15, 2003, now Pat. No. 7,171,544.

(51) Int. Cl.
G06F 9/45       (2006.01)

(52) U.S. Cl. ........ 717/160; 717/149; 717/150; 717/151; 717/153; 717/159; 717/161

(58) Field of Classification Search .................. 717/150, 717/160

See application file for complete search history.

(56) References Cited

U.S. PATENT DOCUMENTS

| 3,621,209 A | 11/1971 | Businger |
| 4,692,896 A | 9/1987 | Sakoda |
| 4,845,652 A | 7/1989 | Bunsen |
| 5,151,991 A | 9/1992 | Iwasawa |
| 5,159,552 A | 10/1992 | van Gasteren |
| 5,200,915 A | 4/1993 | Hayami |
| 5,216,627 A | 6/1993 | McClellan |
| 5,237,685 A | 8/1993 | Toney |
| 5,274,812 A | 12/1993 | Inoue |
| 5,343,554 A | 8/1994 | Koza |
| 5,363,473 A | 11/1994 | Stolfo |
| 5,392,429 A | 2/1995 | Agrawal |
| 5,442,569 A | 8/1995 | Osano |
| 5,481,723 A | 1/1996 | Harris |

(Continued)

FOREIGN PATENT DOCUMENTS

JP            7244647          9/1995

(Continued)

OTHER PUBLICATIONS

Huan et al., "A practical run-time technique for exploiting loop-level parallelism," The Journal of Systems and Software 54 (2000) 259-271.*

(Continued)

*Primary Examiner* — Insun Kang
(74) *Attorney, Agent, or Firm* — Anthony V. S. England; William Steinberg

(57) ABSTRACT

Parallelization of loops is performed for loops having indirect loop index variables and embedded conditional statements in the loop body. Loops having any finite number of array variables in the loop body, and any finite number of indirect loop index variables can be parallelized. There are two particular limitations of the described techniques: (i) that there are no cross-iteration dependencies in the loop other than through the indirect loop index variables; and (ii) that the loop index variables (either direct or indirect) are not redefined in the loop body.

18 Claims, 5 Drawing Sheets

U.S. PATENT DOCUMENTS

| | | | |
|---|---|---|---|
| 5,666,533 | A | 9/1997 | Horiguchi |
| 5,680,557 | A | 10/1997 | Karamchetty |
| 5,842,022 | A * | 11/1998 | Nakahira et al. .............. 717/160 |
| 5,905,892 | A | 5/1999 | Nielsen |
| 6,006,230 | A * | 12/1999 | Ludwig et al. ........................ 1/1 |
| 6,009,267 | A | 12/1999 | Ogawa |
| 6,026,235 | A | 2/2000 | Shaughnessy |
| 6,032,144 | A | 2/2000 | Srivastava |
| 6,061,676 | A | 5/2000 | Srivastava |
| 6,097,815 | A | 8/2000 | Shimada |
| 6,144,932 | A | 11/2000 | Hachiya |
| 6,182,284 | B1 | 1/2001 | Sreedhar |
| 6,209,016 | B1 * | 3/2001 | Hobson et al. ................. 708/491 |
| 6,237,139 | B1 | 5/2001 | Hotta |
| 6,282,704 | B1 | 8/2001 | Iitsuka |
| 6,286,135 | B1 | 9/2001 | Santhanam |
| 6,289,443 | B1 * | 9/2001 | Scales et al. ................... 712/241 |
| 6,292,168 | B1 | 9/2001 | Venable |
| 6,339,840 | B1 * | 1/2002 | Kothari et al. ................. 717/149 |
| 6,349,318 | B1 * | 2/2002 | Vanstone et al. .............. 708/492 |
| 6,367,071 | B1 | 4/2002 | Cao |
| 6,374,403 | B1 * | 4/2002 | Darte et al. .................... 717/161 |
| 6,415,433 | B1 | 7/2002 | Callahan, II |
| 6,427,234 | B1 | 7/2002 | Chambers |
| 6,438,747 | B1 * | 8/2002 | Schreiber et al. ............. 717/160 |
| 6,507,947 | B1 * | 1/2003 | Schreiber et al. ............. 717/160 |
| 6,539,541 | B1 * | 3/2003 | Geva .............................. 717/150 |
| 6,578,196 | B1 | 6/2003 | Bera |
| 6,601,080 | B1 | 7/2003 | Garg |
| 6,654,953 | B1 | 11/2003 | Beaumont |
| 6,708,331 | B1 | 3/2004 | Schwartz |
| 6,721,941 | B1 | 4/2004 | Morshed |
| 6,738,967 | B1 | 5/2004 | Radigan |
| 6,745,215 | B2 | 6/2004 | Bera |
| 6,745,384 | B1 * | 6/2004 | Biggerstaff ................... 717/156 |
| 6,826,585 | B2 | 11/2004 | Mitsunaga et al. |
| 6,948,161 | B2 | 9/2005 | Bera |
| 7,043,510 | B1 | 5/2006 | Bera |
| 7,076,777 | B2 | 7/2006 | Srinivasan |
| 7,089,545 | B2 | 8/2006 | Bera |
| 7,171,544 | B2 | 1/2007 | Bera |
| 7,337,437 | B2 | 2/2008 | Bera |
| 7,836,112 | B2 | 11/2010 | Bera |
| 2001/0003211 | A1 | 6/2001 | Bera |
| 2002/0007385 | A1 | 1/2002 | Stoutemyer |
| 2002/0016887 | A1 * | 2/2002 | Scales .......................... 711/140 |
| 2002/0178196 | A1 * | 11/2002 | Monier ......................... 708/491 |
| 2003/0018671 | A1 | 1/2003 | Bera |
| 2003/0056083 | A1 | 3/2003 | Bates |
| 2003/0120900 | A1 * | 6/2003 | Stotzer et al. ................. 712/215 |
| 2004/0019622 | A1 * | 1/2004 | Elbe et al. ..................... 708/492 |
| 2004/0158691 | A1 * | 8/2004 | Redford .......................... 712/13 |
| 2004/0220989 | A1 * | 11/2004 | Elbe et al. ..................... 708/492 |
| 2005/0028141 | A1 * | 2/2005 | Kurhekar et al. ............. 717/119 |
| 2006/0015550 | A1 | 1/2006 | Bera |
| 2006/0036413 | A1 * | 2/2006 | Campbell et al. ................. 703/2 |
| 2006/0041872 | A1 * | 2/2006 | Poznanovic et al. .......... 717/140 |
| 2006/0080071 | A1 | 4/2006 | Bera |
| 2007/0169061 | A1 | 7/2007 | Bera |

FOREIGN PATENT DOCUMENTS

| | | |
|---|---|---|
| JP | PUPA-11-110225 | 4/1999 |

OTHER PUBLICATIONS

Huang et al., "Non-linear array data dependence test," The Journal of Systems and Software vol. 57, Issue 2, Jun. 15, 2001, pp, 145-154.*

Hwang, J.J., et al. "A New Access Control Method Using Prime Factorisation." The Computer Journal, col. 35, No. 1, 1992, p. 16-20.

Tanenbaum, Andrew S. Structured Computer Organization Second Ed Prentice: 1984, p. 10-12.

Blume, William and Rudolf Eigenmann. "The Range Test: A Dependence Test for Symbolic, Non-linear Expressions." IEEE: 1994,528-537.

Kobiltz, Neal. Algebraic Aspects of Cryptography. Springer: 1999, p. 28.

Blume, W. et al., "The Range Test: A Dependence Test for Symbolic, Non-linear Expressions." IEEE 1994, pp. 528-537.

Cmelik et al., Dimensional Analysis with C++, IEEE May 1988, pp. 21-27.

Huang, Tsung-Chuan and Po-Hsueh Hsu, "A Practical run-time technique for exploiting loop-level parallelism." Journal of Systems and Software 54 (2000), pp. 259-271.

Huang, Tsung-Chuan and Cheng-Ming Yang, "Non-linear array data dependence test." Journal of Systems and Software 57 (2001), pp. 145-154.

Huang et al. "An Efficient Run-Time Scheme for Exploring Parallelism on Multiprocessor Systems", M. Valero, V. K. Prasanna, and S. Vajapeyam (Eds.):: HiPC2000, LNCS 1970, pp. 27-36 (2000).

Hwang, J. J. et al., "A New Access Control Method Using Prime Factorisation." The Computer Journal, vol. 35, No. 1, 1992, pp. 16-20.

Koblitz, Neal, Algebraic Aspects of Cryptography. Springer: 1999, p. 28.

Ledermann, W., Algebra vol. 1 of Handbook of Applicable Mathematics, John Wiley & Sons, New York, 1980, Chapter 8.

Leon, Steven J., Linear Algebra with Applications, 1998, Prentice Hall, 5th edition, pp. 1-83.

Novak et al., Conversion of Units of Measurement. IEEE Transactions On Software Engineering, vol. 21, No. 8, Aug. 1995, pp. 651-661.

Pottenger, W. M.; Induction Variable Substitution and Reduction Recognition in the Polaris Parallelizing Compiler, 1980, 70 pages.

Press, W.H., Numerical Recipes in FORTRAN, Second Edition, Cambridge Univ. Press, 1992, Chapter 2.

Ralston, A., A First Course in Numerical Analysis, International Student Edition, McGraw-Hill, New York, 1965, Chapter 9.

Rauchwerger et al., The LRPD Test: Speculative Run-Time Parallelization of Loops with Privatization and Reduction Parallelization; IEEE Transactions on Parallel and Distributed Systems, vol. 10, No. 2, Feb. 1999, pp. 160-180.

Rauchwerger, L., Run-Time Parallelization: It's Time Has Come; Journal of Parallel Computing, Special Issue on Language and Compilers, vol. 24, Nos. 3-4, 1998, pp. 527-556.

Rosen et al., Global Value Numbers and Redundant Computations; ACM, Jan. 1988. pp. 12-27.

Stoer, "Introduction to Numerical Analysis," 1980, Springer-Verlag, pp. 97-102, 144-147, and 159-161.

Suganuma et al., Detection and Global Optimization of Reduction Operations for Distributed Parallel Machines; 1996, ACM, pp. 18-25.

Tanenbaum, Andrew S., Structured Computer Organization, Second Edition, Prentice-Hall, Inc. 1984, pp. 11-12 and 10.

Jun. 6, 2003, Office Action (Mail Date Jun. 27, 2003) for U.S. Appl. No. 09/728,096, Filing Date Dec. 1, 2000.

Dec. 15, 2004 filed Petitiion to Revive and Response to Office Action (Mail Date Jun. 27, 2003) for U.S. Appl. No. 09/728,096, Filing Date Dec. 1, 2000, NOTE: Notice of Abandonment Jan. 13, 2004 for failing to Respond to Office Action, Nov. 17, 2005 Petition Granted.

Feb. 13, 2006, Office Action (Mail Date Feb. 13, 2006) for U.S. Appl. No. 09/728,096, Filing Date Dec. 1, 2000.

May 11, 2006, Filed Response to Office Action (Mail Date Feb. 13, 2006) for U.S. Appl. No. 09/728,096, Filing Date Dec. 1, 2000.

Jul. 25, 2006, Final Office Action (Mail Date Jul. 25, 2006) for U.S. Appl. No. 09/728,096, Filing Date Dec. 1, 2000.

Sep. 22, 2006, Filed Response to Final Office Action (Mail Date Jul. 25, 2006) for U.S. Appl. No. 09/728,096, Filing Date Dec. 1, 2000.

Oct. 20, 2006, Office Action (Mail Date Oct. 20, 2006) for U.S. Appl. No. 09/728,096, Filing Date Dec. 1, 2000.

Jan. 22, 2007, Filed Response to Office Action (Mail Date Oct. 20, 2006) for U.S. Appl. No. 09/728,096, Filing Date Dec. 1, 2000.

Apr. 10, 2007, Final Office Action (Mail Date Apr. 10, 2007) for U.S. Appl. No. 09/728,096, Filing Date Dec. 1, 2000.

Jun. 4, 2003, Filed Response to Final Office Action (Mail Date Apr. 10, 2007) for U.S. Appl. No. 09/728,096, Filing Date Dec. 1, 2000.

Jun. 28, 2007, Advisory Action (Mail Date Jun. 28, 2007) for U.S. Appl. No. 09/728,096, Filing Date Dec. 1, 2000.

Jul. 9, 2007, Filed Request for Continued Examination (RCE) with Preliminary Amendment for U.S. Appl. No. 09/728,096, Filing Date Dec. 1, 2000.

Oct. 3, 2007 Notice of Allowance (Mail Date Jun. 27, 2003) for U.S. Appl. No. 09/728,096, Filing Date Dec. 1, 2000.
Nov. 21, 2007 Filed Amendment under 37 CFR 1.312 for U.S. Appl. No. 09/728,096—Filing Date Dec. 1, 2000.
Jan. 8, 2008, Response to Rule 312 Communication (Mail Date Jan. 8, 2008) for U.S. Appl. No. 09/728,096—Filing Date Dec. 1, 2000.
Jan. 28, 2008, Terminal Disclaimer Filed for U.S. Appl. No. 12/015,591—Filing Date Jan. 17, 2008.
Jan. 29, 2008, Request for Consideration for U.S. Appl. No. 12/015,591—Filing Date Jan. 17, 2008.
Mar. 18, 2008, Notice of Allowance for U.S. Appl. No. 12/015,591—Filing Date Jan. 17, 2008.
Dec. 17, 2002, Notice of Allowance (Mail Date Dec. 17, 2002) for U.S. Appl. No. 09/589,394, Filing Date Jun. 7, 2000.
Sep. 5, 2003 Office Action (Mail Date Sep. 5, 2003) for U.S. Appl. No. 09/839,025, Filing Date Apr. 20, 2001.
Dec. 1, 2003 filed Response to Office Action (Mail Date Sep. 5, 2003) for U.S. Appl. No. 09/839,025, Filing Date Apr. 20, 2001.
Jan. 30, 2004 Notice of Allowance (Mail Date Jan. 30, 2004) for U.S. Appl. No. 09/839,025, Filing Date Apr. 20, 2001.
Apr. 22, 2004 Office Action (Mail Date Apr. 22, 2004) for U.S. Appl. No. 09/839,071, Filing Date Apr. 20, 2001.
Jul. 20, 2004 filed Response to Office Action (Mail Date Apr. 22, 2004) for U.S. Appl. No. 09/839,071, Filing Date Apr. 20, 2001.
Oct. 20, 2004 Office Action (Mail Date Oct. 20, 2004) for U.S. Appl. No. 09/839,071, Filing Date Apr. 20, 2001.
Jan. 14, 2005 filed Response to Office Action (Mail Date Oct. 20, 2004) for U.S. Appl. No. 09/839,071, Filing Date Apr. 20, 2001.
Jun. 2, 2005 Notice of Allowance (Mail Date Jun. 2, 2005) for U.S. Appl. No. 09/839,071, Filing Date Apr. 20, 2001.
Dec. 17, 2002 Notice of Allowance (Mail Date Mar. 28, 2006) for U.S. Appl. No. 10/321,971, Filing Date Dec. 17, 2002.
Apr. 3, 2003 Office Action (Mail Date Apr. 3, 2003) for U.S. Appl. No. 09/597,478, Filing Date Jun. 20, 2000.
Dec. 1, 2003 Response to Office Action for U.S. Appl. No. 09/597,478, Filing Date Jun. 20, 2000.
Apr. 22, 2004 Decision on Petition to Revive, Petition to Review, and Response to Office Action (Mail Date Apr. 3, 2003) for U.S. Appl. No. 09/597,478, Filing Date Jun. 20, 2000, NOTE: Notice of Abandonment Feb. 4, 2004 for failing to Respond to Office Action Apr. 22, 2004 Petition Granted.
Jul. 27, 2004 Final Office Action (Mail Date Jul. 27, 2004) for U.S. Appl. No. 09/597,478, Filing Date Jun. 20, 2000.
Oct. 27, 2004 filed Request for Continued Examination (RCE) for U.S. Appl. No. 09/597,478, Filing Date Jun. 20, 2000.
Jan. 5, 2005 Office Action (Mail Date Jan. 5, 2005) for U.S. Appl. No. 09/597,478, Filing Date Jun. 20, 2000.
Apr. 5, 2005 filed Response to Office Action (Mail Date Jan. 5, 2005) for U.S. Appl. No. 09/597,478, Filing Date Jun. 20, 2000.
May 11, 2005 Notice of Allowance (Mail Date May 11, 2005) for U.S. Appl. No. 09/597,478, Filing Date Jun. 20, 2000.
Feb. 18, 2010 Office Action (Mail Date Feb. 18, 2010) for U.S. Appl. No. 11/231,091, Filing Date Sep. 20, 2005.
May 18, 2010 filed Response to Office Action (Mail Date Feb. 18, 2010) for U.S. Appl. No. 11/231,091, Filing Date Sep. 20, 2005.
May 21, 2010 Notice of Noncompliant Response (Mail Date May 21, 2010) for U.S. Appl. No. 11/231,091, Filing Date Sep. 20, 2005.
May 25, 2010 filed Response to Notice of Noncompliant Response (Mail Date May 21, 2010) for U.S. Appl. No. 11/231,091, Filing Date Sep. 20, 2005.
Jul. 9, 2010 fNotice of Allowance (Mail Date Jul. 9, 2010) for U.S. Appl. No. 11/231,091, Filing Date Sep. 20, 2005.
Oct. 27, 2009 Office Action (Mail Date Oct. 27, 2009) for U.S. Appl. No. 11/287,100, Filing Date Nov. 23, 2005.
Jan. 7, 2010 filed Response to Office Action (Mail Date Oct. 27, 2009) for U.S. Appl. No. 11/287,100, Filing Date Nov. 23, 2005.
Mar. 30, 2010 Final Office Action (Mail Date Mar. 30, 2010) for U.S. Appl. No. 11/287,100, Filing Date Nov. 23, 2005.
Jun. 30, 2010 filed Response for Continued Examination (RCE) for U.S. Appl. No. 11/287,100, Filing Date Nov. 23, 2005.
May 5, 2006 Office Action (Mail Date May 5, 2006) for U.S. Appl. No. 10/736,343 Filing Date Dec. 15, 2003.
Sep. 5, 2006 filed Response to Office Action (Mail Date May 5, 2006) for U.S. Appl. No. 10/736,343 Filing Date Dec. 15, 2003.
Sep. 28, 2006 Applicant summary of interview with examiner for U.S. Appl. No. 10/736,343 Filing Date Dec. 15, 2003.
Sep. 29, 2006 filed Amendment After Final (Mail Date Sep. 29, 2006) for U.S. Appl. No. 10/736,343 Filing Date Dec. 15, 2003.
Oct. 4, 2006 Notice of Allowance (Mail Date Oct. 4, 2006) for U.S. Appl. No. 10/736,343 Filing Date Dec. 15, 2003.
Oct. 17, 2005 filed Response to Office Action (Mail Date Jun. 16, 2005) for U.S. Appl. No. 10/215,431 Filing Date Aug. 7, 2002.
Jun. 16, 2005 Nonfinal Office Action (Mail Date Jun. 16, 2005) for U.S. Appl. No. 10/215,431 Filing Date Aug. 7, 2002.
Jan. 12, 2006 Notice of Allowance (Mail Date Jan. 12, 2006) for U.S. Appl. No. 10/215,431 Filing Date Aug. 7, 2002.

* cited by examiner

RUN-TIME PARALLELIZATION OF LOOPS IN COMPUTER PROGRAMS USING BIT VECTORS

CROSS-REFERENCE TO RELATED APPLICATION

This application is a continuation of prior application Ser. No. 10/736,343, which was originally filed on Dec. 15, 2003, now U.S. Pat. No. 7,171,544, and is hereby incorporated herein by reference.

FIELD OF THE INVENTION

The present invention relates to run-time parallelization of computer programs that have loops containing indirect loop index variables and embedded conditional statements.

BACKGROUND

A key aspect of parallel computing is the ability to exploit parallelism in one or more loops in computer programs. Loops that do not have cross-iteration dependencies, or where such dependencies are linear with respect to the loop index variables, one can use various existing techniques to achieve parallel processing. A suitable reference for such techniques is Wolfe, M., *High Performance Compilers for Parallel Computing*, Addison-Wesley, 1996, Chapters 1 and 7. Such techniques perform a static analysis of the loop at compile-time. The compiler suitably groups and schedules loop iterations in parallel batches without violating the original semantics of the loop.

There are, however, many cases in which static analysis of the loop is not possible. Compilers, in such cases, cannot attempt any parallelization of the loop before run-time.

As an example, consider the loop of Table 1 below, for which parallelization cannot be performed.

TABLE 1

```
do i = 1, n
   x[u(i)] = ....
   ....  ....
   ....  ....
   y[i] = x[r(i)] ...
   ....  ....
   ....  ....
enddo
```

Specifically, until the indirect loop index variables $u(i)$ and $r(i)$ are known, loop parallelization cannot be attempted for the loop of Table 1.

For a review on run-time parallelization techniques, refer to Rauchwerger, L., *Run-Time Parallelization: It's Time Has Come*, Journal of Parallel Computing, Special Issue on Language and Compilers, Vol. 24, Nos. 3-4, 1998, pp. 527-556. A preprint of this reference is available via the World Wide Web at the address www.cs.tamu.edu/faculty/rwerger/pubs.

Further difficulties, not discussed by Wolfe or Rauchwerger, arise when the loop body contains one or more conditional statements whose evaluation is possible only during runtime. As an example, consider the loop of Table 2 below, for which parallelization cannot be attempted by a compiler.

TABLE 2

```
do i = 1, n
   x[u(i)] = ....
   ....  ....
   ....  ....
   if (cond) then y[i] = x[r(i)] ...
   else y[i] = x[s(i)] ...
   ....  ....
   ....  ....
enddo
```

The value of $r(i)$ and $s(i)$ in the loop of Table 2 above, as well as the indirect loop index variables $u(i)$ must be known before loop parallelization can be attempted. Further, in each iteration, the value of cond must be known to decide whether $r(i)$ or $s(i)$ should be included in a particular iteration.

Further advances in loop parallelisation are clearly needed in view of these and other observations.

SUMMARY

A determination is made whether a particular loop in a computer program can be parallelized. If parallelization is possible, a suitable strategy for parallelization is provided. The techniques described herein are suitable for loops in which (i) there are any finite number of array variables in the loop body, such as x and y in the example of Table 2 above;
(ii) there are any finite number of indirect loop index variables, such as u, r, and s in the example of Table 2 above;
(iii) each element of each array variable and of each indirect loop index variable is uniquely identifiable by a direct loop index variable, such as i in the example of Table 2 above;
(iv) the loop index variables (either direct or indirect variables) are not redefined within the loop; and
(v) there are no cross-iteration dependencies in the loop other than through the indirect loop index variables.

Parallelization is attempted at run-time for loops, as noted above, having indirect loop index variables and embedded conditional statements in the loop body. A set of active array variables and a set of indirect loop index variables are determined for the loop under consideration. Respective ranges of the direct loop index values and indirect loop index values are determined. Indirect loop index values are determined for each iteration, and each such value so determined is associated with a unique number. Based on these unique numbers, an indirectly indexed access pattern for each iteration in the loop is calculated.

Using the indirectly indexed access pattern, the loop iterations are grouped into a minimum number of waves such that the iterations comprising a wave have no cross-iteration dependencies among themselves. The waves are then scheduled in a predetermined sequence and the iterations in a wave are executed independent of each other in the presence of multiple computing processors.

DETAILED DESCRIPTION

Figure 1:
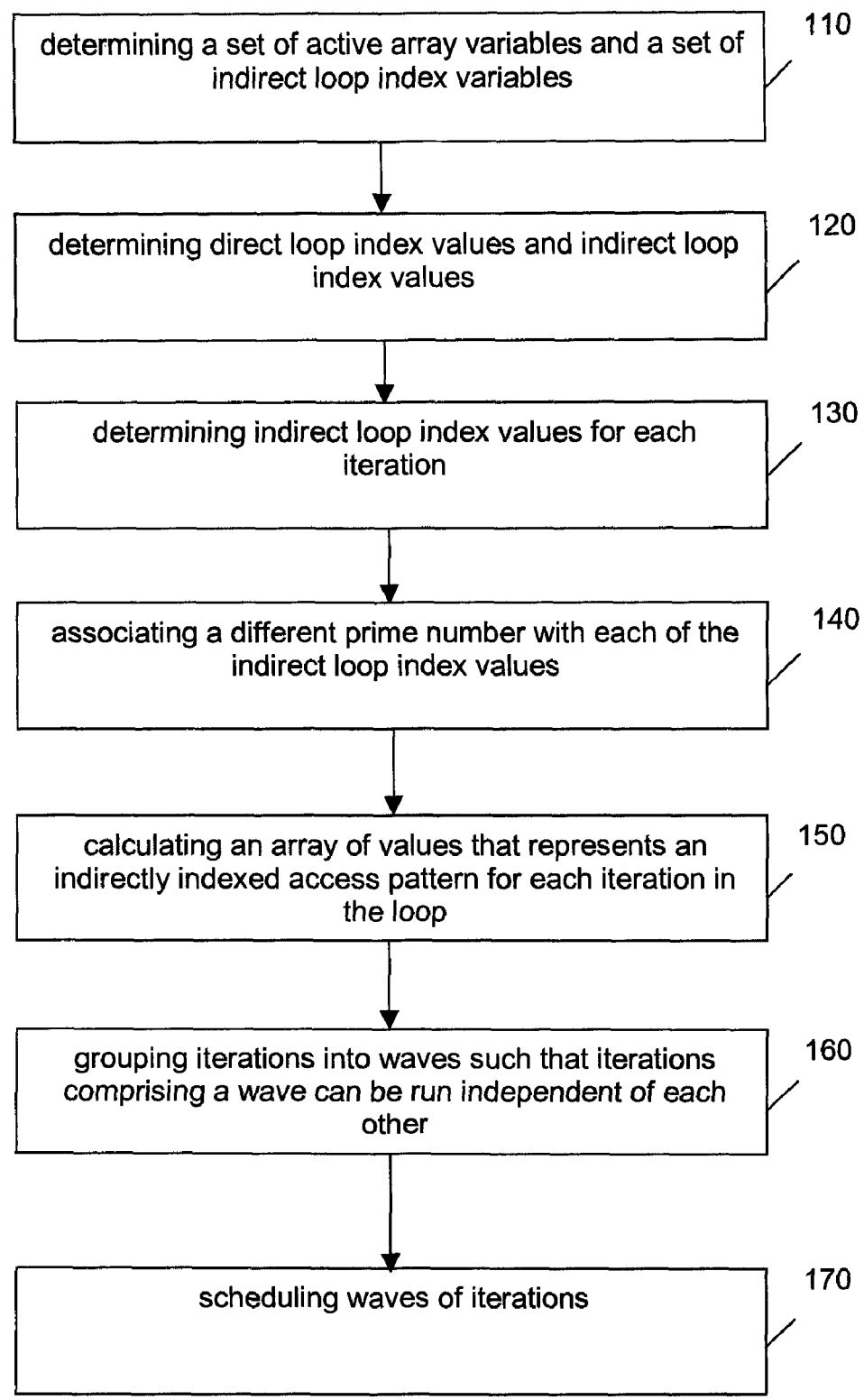
FIG. 1 is a flow chart of steps involved in performing run-time parallelization of a loop that has indirect loop index variables and one embedded Boolean condition.

The following two brief examples are provided to illustrate cases in which an apparently unparallelizable loop can be parallelized by modifying the code, but not its semantics. Table 3 below provides a first brief example.

TABLE 3

```
b = b0
do i = 1, n
    x[u(i)] = b
    b = b+1
enddo
```

The loop of Table 3 above cannot be parallelized, since the calculated value of b depends on the iteration count i. For example, for the 3rd iteration, x[u(3)]=b0+2, where b0 is the value of b just prior to entering the loop. The loop can, however, be parallelized if the loop is rewritten as shown in Table 4 below.

TABLE 4

```
b = b0
do i = 1, n
    x[u(i)] = b0 + i − 1
enddo
b = b0 + n
```

Table 5 below provides a second brief example.

TABLE 5

```
do i = 1, n
    c = x[u(i)]
    .........
enddo
```

The loop of Table 5 above is parallelizable if the loop is rewritten as shown in Table 6 below.

TABLE 6

```
do i = 1, n
    c = x[u(i)]
    .........
enddo
c = x[u(n)]
```

These and other existing rules that improve parallelization of loops can be invoked whenever applicable. The above-mentioned references of Wolfe and Rauchwerger are suitable references for further such rules that can be adopted as required. The above referenced content of these references is incorporated herein by reference.

Loop Parallelization Procedure

The loop parallelization procedure described herein is described in greater detail with reference to the example of Table 7 below.

TABLE 7

```
do i = 5, 15
    x1[r(i)] = s1[u(i)]
    x2[t(i)] = s2[r(i)] * s1[t(i)] ...
    x3[u(i)] = x1[r(i)]/x3[u(i)]
    if (x2[t(i)]) then x4[v(i)] = s2[r(i)] + x5 [t(i)] ...
    else x3[v(i)] = x5[w(i)]
    x5[u(i)] = x3[v(i)] + x4[v(i)] ...
    x6[u(i)] = x6[u(i)] − ...
    x7[v(i)] = x7[v(i)] + x1(r(i)) − s1[u(i)]
    ....   ....
    ....   ....
enddo
```

In some cases, the analysis of cross-iteration dependencies is simplified if an array element that appears on the right hand side of an assignment statement is replaced by the most recent expression defining that element, if the expression exists in a statement prior to this assignment statement. In the example of Table 7 above, x1[r(i)] is such an element whose appearance on the right hand side of assignment statements for x3[u(i)] and x7[v(i)] can be replaced by s1[u(i)] since there is an earlier assignment statement x1[r(i)]=s1[u(i)].

Thus, for the example of Table 7 above, the code fragment of Table 8 below represents the example of Table 7 above, after such operations are performed, and represents the results of appropriate replacement.

TABLE 8

```
do i = 5, 15
    x1[r(i)]=s1[u(i)]              // Defines x1[r(i)]
    x2[t(i)] = s2[r(i)] * s1[t(i)] ...
    x3[u(i)] = (s1[u(i)])/x3[u(i)]   // Replaces x1[r(i)]
    if (x2[t(i)]) then x4[v(i)] = s2[r(i)] + x5[t(i)] ...
    else x3[v(i)] = x5[w(i)]
    x5[u(i)] = x3[v(i)] + x4[v(i)] ...
    x6[u(i)] = x6[u(i)] − ...
    x7[v(i)]=x7[v(i)] // Identity after replacing x1[r(i)]
    ....   ....
    ....   ....
enddo
```

Further simplification of the code fragment of Table 8 above is possible if statements that are identities, or become identities after the replacement operations, are deleted. Finally, if the array variable x1 is a temporary variable that is not used after the loop is completely executed, then the assignment statement defining this variable (the first underlined statement in the code fragment of Table 8 above) is deleted without any semantic loss, consequently producing the corresponding code fragment of Table 9 below.

TABLE 9

```
do i = 5, 15
    x2[t(i)] = s2[r(i)] * s1[t(i)] ...
    x3[u(i)] = (s1[u(i)])/x3[u(i)]
    if (x2[t(i)]) then x4[v(i)] = s2[r(i)] + x5[t(i)] ...
    else x3[v(i)] = x5[w(i)]
    x5[u(i)] = x3[v(i)] + x4[v(i)] ...
    x6[u(i)] = x6[u(i)] − ...
    ....   ....
    ....   ....
enddo
```

The array element replacement operations described above with reference to the resulting code fragment of Table 9 above can be performed in source code, using character string "find and replace" operations. To ensure semantic correctness, the replacement string is enclosed in parentheses, as is done in Table 8 for the example of Table 7. To determine if an assignment statement expresses an identity, or to simplify the assignment statement, one may use any suitable technique. One reference describing suitable techniques is commonly assigned U.S. patent application Ser. No 09/597,478, filed Jun. 20, 2000, naming as inventor Rajendra K Bera and entitled "*Determining the equivalence of two algebraic expressions*". The content of this reference is hereby incorporated by reference.

Potential advantages gained by the techniques described above are a reduced number of array variables for analysis, and a clearer indication of cross-iteration dependencies within a loop. Further, a few general observations can be made with reference to the example of Table 7 above.

First, non-conditional statements in the loop body that do not contain any array variables do not constrain parallelization, since an assumption is made that cross-iteration dependencies do not exist due to such statements. If such statements exist, however, a further assumption is made that these statements can be handled, so as to allow parallelization.

Secondly, only array variables that are defined (that is, appear on the left hand side of an assignment statement) in the loop body affect parallelization. In the case of Table 9 above, the set of such variables, referred to as active array variables, is {x2, x3, x4, x5, x6} when the condition part in the statement if (x2[t(i)]) evaluates to true and {x2, x3, x5, x6} when this statement evaluates to false.

If, for a loop, every possible set of active array variables is empty, then that loop is completely parallelizable.

Since detection of variables that affect loop parallelization can be performed by a compiler through static analysis, this analysis can be performed by the compiler. Thus, respective lists of array variables that affect parallelization for each loop in the computer program can be provided by the compiler to the run-time system.

In the subsequent analysis, only indirect loop index variables associated with active array variables are considered. In the example of Table 9 above, these indirect loop index variables are {t, u, v} when the statement if (x2[t(i)]) evaluates to true and {t, u, v, w} when this statement evaluates to false.

Let $V \equiv \{v_1, v_2, \ldots v_n\}$ be the set of all active array variables that appear in the loop body, $V_T$ be the subset of V that contains only those active array variables that are active when the Boolean condition evaluates to true, and $V_F$ be the subset of V that contains only those active array variables that are active when the Boolean condition evaluates to false. Furthermore, let $I \equiv \{i_1, i_2, \ldots i_r\}$ be the set of indirect loop index variables that is associated with the active array variables in V, $I_T$ be the set of indirect loop index variables that is associated with the active array variables in $V_T$, and $I_F$ be the set of indirect loop index variables that is associated with the active array variables in $V_F$. Note that $V = V_T \cup V_F$, $I = I_T \cup I_F$, and the active array variables in $V_T \cap V_F$ are active in the loop body, independent of how the Boolean condition evaluates.

In the example of Table 9, these sets are outlined as follows.

V={x2, x3, x4, x5, x6}

$V_T$={x2, x3, x4, x5, x6}

$V_F$={x2, x3, x5, x6}

I={t, u, v, w}

$I_T$={t, u, v}

$I_F$={t, u, v, W}

Let the values of loop index i range from $N_1$ to $N_2$, and those of $i_1, i_2, \ldots i_r$ range at most from $M_1$ to $M_2$.

In the kth iteration (that is, $i=N_1+k-1$), the indirect loop index variables have values given by $i_1(i), i_2(i), \ldots i_r(i)$, and each such value is in the range $[M_1, M_2]$. To facilitate the description of further calculation steps, a different prime number p(l) is associated with each number l in the range $[M_1, M_2]$. The role of these prime numbers is explained in further detail below.

The parallelization algorithm proceeds according to the steps listed below as follows.

1. Create the arrays $S_A$, $S_T$ and $S_F$ whose respective ith element is given as follows.

$S_A(i) = \Pi_{q \in I} p(q(i))$ $S_T(i) = \Pi_{q \in IT} p(q(i))$ $S_F(i) = \Pi_{q \in IF} p(q(i))$

These array elements are collectively referred to as the indirectly indexed access pattern for iteration i. The use of prime numbers in place of the indirect loop index values allows a group of such index values to be represented by a unique number. Thus $S_\alpha(i) = S_\beta(j)$, where $\alpha, \beta \in \{A, T, F\}$, if and only if $S_\alpha(i)$ and $S_\beta(j)$ each contain the same mix of prime numbers. This property follows from the fundamental theorem of arithmetic, which states that every whole number greater than one can be written as a product of prime numbers. Apart from the order of these prime number factors, there is only one such way to represent each whole number as a product of prime numbers. Note that one is not a prime number, and that two is the only even number that is a prime.

Consequently, if the greatest common divisor (GCD) of $S_\alpha(i)$ and $S_\beta(j)$, is equal to one, there are no common prime numbers between $S_\alpha(i)$ and $S_\beta(j)$, and therefore, no common index values between the ith ($\alpha$-branch) and the jth ($\beta$-branch) iterations. On the other hand, a greatest common divisor greater than one implies that there is at least one common prime number between $S_\alpha(i)$ and $S_\beta(j)$ and, consequently, at least one common index value between the ith ($\alpha$-branch) and the jth ($\beta$-branch) iterations.

The significance of the above result is that if the greatest common divisor of $S_\alpha(i)$ and $S_\beta(j)$ is equal to one then cross-iteration dependencies do not exist between the ith ($\alpha$-branch) and the jth ($\beta$-branch) iterations.

2. Set k=1. Let $R_1$ be the set of values of the loop index i (which may range in value from $N_1$ to $N_2$), for which the loop can be run in parallel in the first "wave". Let $N \equiv \{N_1, N_1+1, N_1+2, \ldots, N_2\}$. The loop index values that belong to $R_1$ are determined as described by the pseudocode provided in Table 10 below.

TABLE 10

```
Initialize R_1 = {N_1}.
do j = N_1, N_2
  if (C cannot be evaluated now) S(j) = S_A(j)
  else {
    if (C) S(j) = S_T(j)
    else S(j) = S_F(j)
  }
  if (j = N_1) continue;
  do i = N_1, j−1
```

TABLE 10-continued

```
        drop_j = GCD(S(i), S(j)) − 1
        if (drop_j > 0) break       // Indicates that i, j iterations interact.
    enddo
    if (drop_j = 0) R₁ ← R₁ ∪ {j}
enddo
```

Following from the pseudocode of Table 10, if $R_1 \neq N$, go to step 3, or else go to step 4. The intent of the first loop in Table 10 is to first check whether the condition in the program loop represented by C in the statement "if (C) . . . " can be evaluated before the iteration is executed. For example, a condition appearing in a program loop, such as $C \equiv t(i)-2>0$, where $t(i)$ is an indirect loop index variable, can be evaluated without any of the program loop iterations being executed since the entire t array is known before the loop is entered. On the other hand, a condition such as $C \equiv x2[t(i)]! = 0$ can be evaluated only if $x2[t(i)]$ has not been modified by any previous iteration, otherwise not. If the condition C cannot be evaluated before the program loop iteration is executed, then one cannot a priori decide which indirect index variables are actually used during execution and therefore all the indirect index variables in I must be included in the analysis. When the condition C can be evaluated before the program loop iteration is executed, then one of $I_T$ or $I_F$, as found applicable, is chosen.

3. Set $k \leftarrow k+1$ for the kth "wave" of parallel computations. Save the loop index values of the kth wave in $R_k$. To determine the values saved in $R_k$, proceed as described by the pseudocode provided in Table 11 below.

TABLE 11

```
Initialize R_k = {l}, where l is the smallest index in the set
    N − {R₁ ∪ R₂ ∪ ... ∪ R_{k−1}}
do j = l, N₂
    if (j ∈ R₁ ∪ R₂ ∪ ... ∪ R_{k−1}) continue
    if (C cannot be evaluated now) S(j) = S_A(j)
    else {
        if (C) S(j) = S_T(j)
        else   S(j) = S_F(j)
    }
    if (j = l) continue
    do i = l, j−1
        if (i ∈ R₁ ∪ R₂ ∪ ... ∪ R_{k−1}) continue
        drop_j = GCD(S(i), S(j)) − 1
        if (drop_j > 0) break
    enddo
    if (drop_j = 0) R_k ← R_k ∪ {j}
enddo
```

Following from the pseudocode of Table 11 above, if $R_1 \cup R_2 \cup \ldots \cup R_k \neq N$, repeat step 3, or else go to step 4.

4. All loop index values saved in a given $R_k$ can be run in the kth "wave". Let $n_k$ be the number of loop index values ($n_k$ is the number of iterations) saved in $R_k$. Let $n_p$ be the number of available processors over which the iterations can be distributed for parallel execution of the loop. The iterations can be scheduled in many ways, especially if all the processors are not of the same type (for example, in terms of speed, etc). A simple schedule is as follows: Each of the first $n_1 = n_k \mod n_p$ processors is assigned successive blocks of ($n_k/n_p + 1$) iterations, and the remaining processors are assigned $n_k/n_p$ iterations.

5. The "waves" are executed one after the other, in sequence, subject to the condition that the next wave cannot commence execution until the previous "wave" completely executes. This is referred to as the wave synchronization criterion.

In relation to the above described procedure of steps 1 to 5, the following observations are made.
(a) In step 1, the $S_\alpha(i)$s, that is, $S_A(i)$, $S_T(i)$, and $S_F(i)$, can be calculated in parallel.
(b) The GCDs of $S(i)$ and $S(j)$ are calculated for $j=N_1+1$ to $N_2$ and for $i=N_1$ to $j−1$. The calculations are performed in parallel since each GCD can be calculated independently.
(c) A possible way of parallelizing steps 2 and 3 is to dedicate one processor to these calculations. Let this particular processor calculate $R_1$. When $R_1$ is calculated, other processors start calculating the loop iterations according to $R_1$, while the particular processor starts calculating $R_2$. When $R_2$ is calculated and the loop iterations according to $R_1$ are completed, the other processors start calculating the loop iterations according to $R_2$, while the same particular processor starts calculating $R_3$, and so on.

Procedural overview

Before providing example applications of the described techniques, an overview of these described techniques is now provided with reference to FIG. 1. FIG. 1 is a flow chart of steps involved in performing the described techniques. A set of active array variables and a set of indirect loop index variables are determined for the loop under consideration in step 110. Respective direct loop index values and indirect loop index values are determined in step 120.

Indirect loop index values $i_1(i), i_2(i), \ldots, i_r(i)$ are determined for each iteration, in step 130. Each such value so determined in step 130 is associated with a unique prime number in step 140. For each iteration, an array of values is then calculated that represents an indirectly indexed access pattern for that iteration, in step 150.

A grouping of iterations into a minimum number of waves is made such that the iterations comprising a wave are executable in parallel in step 160.

Finally, the waves are sequentially scheduled in an orderly fashion to allow their respective iterations to execute in parallel in step 170.

Figure 2A:
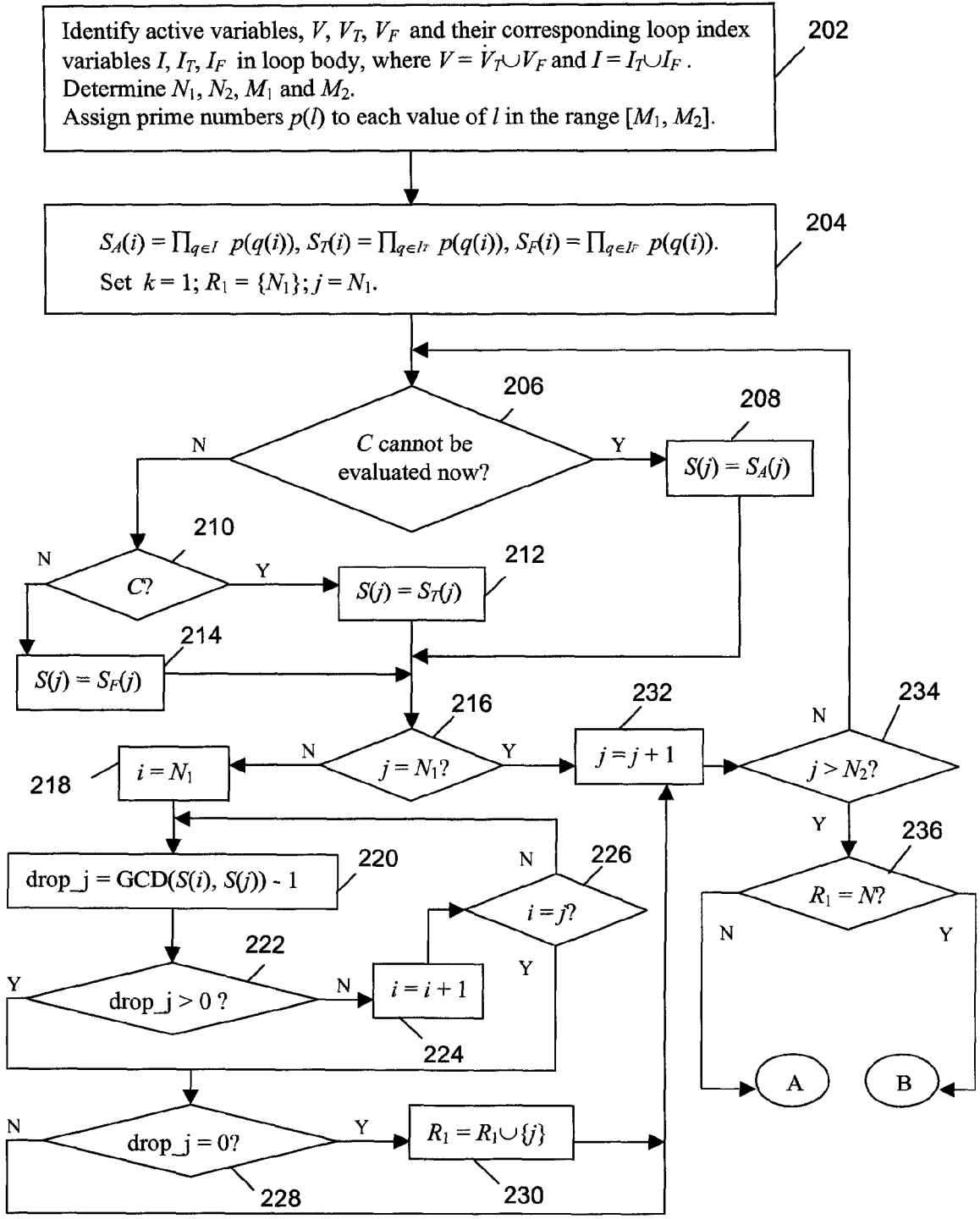
FIGS. 2A, 2B and 2C jointly form a flow chart of steps representing an algorithm for performing run-time parallelization.
Figure 2B:
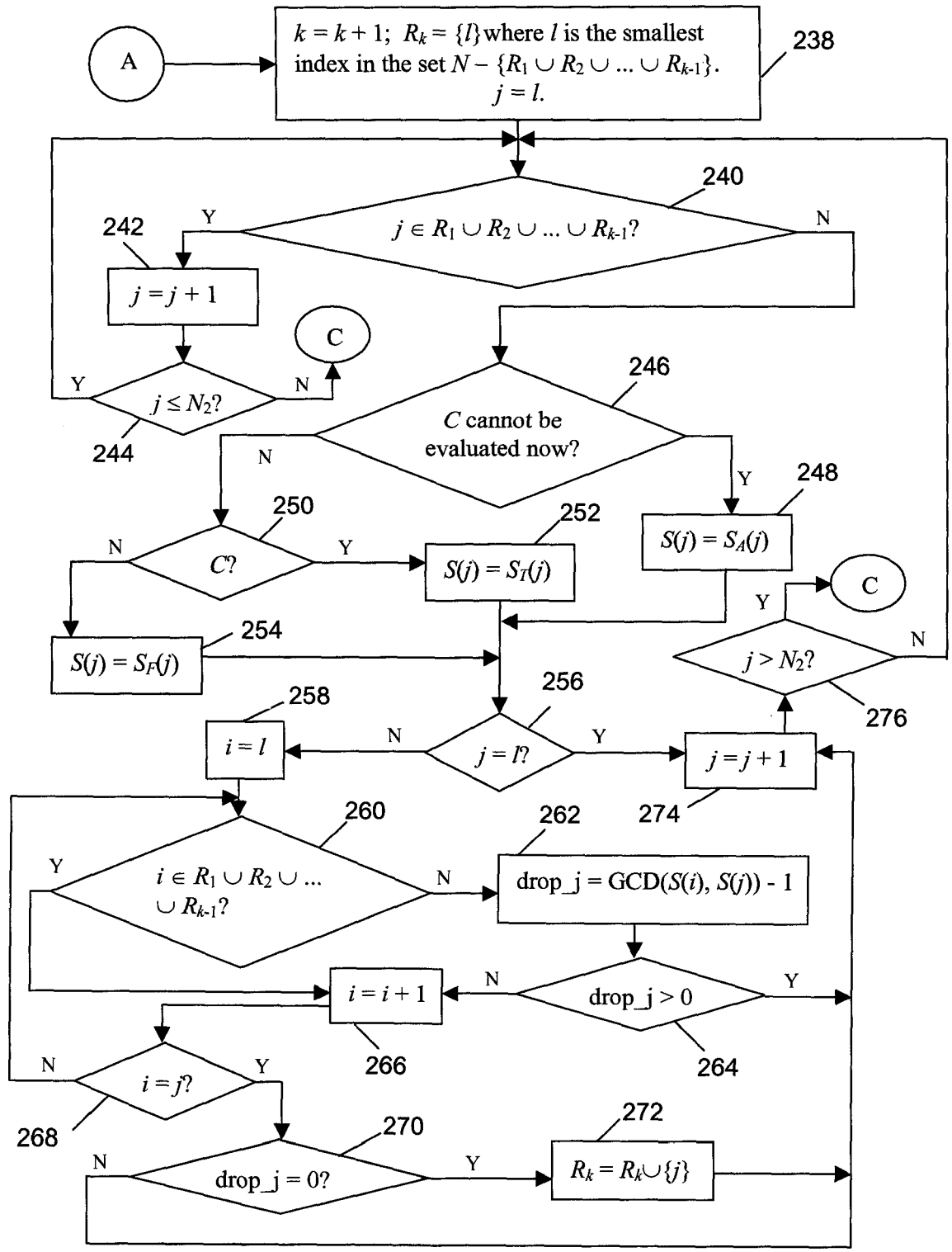
Figure 2C:
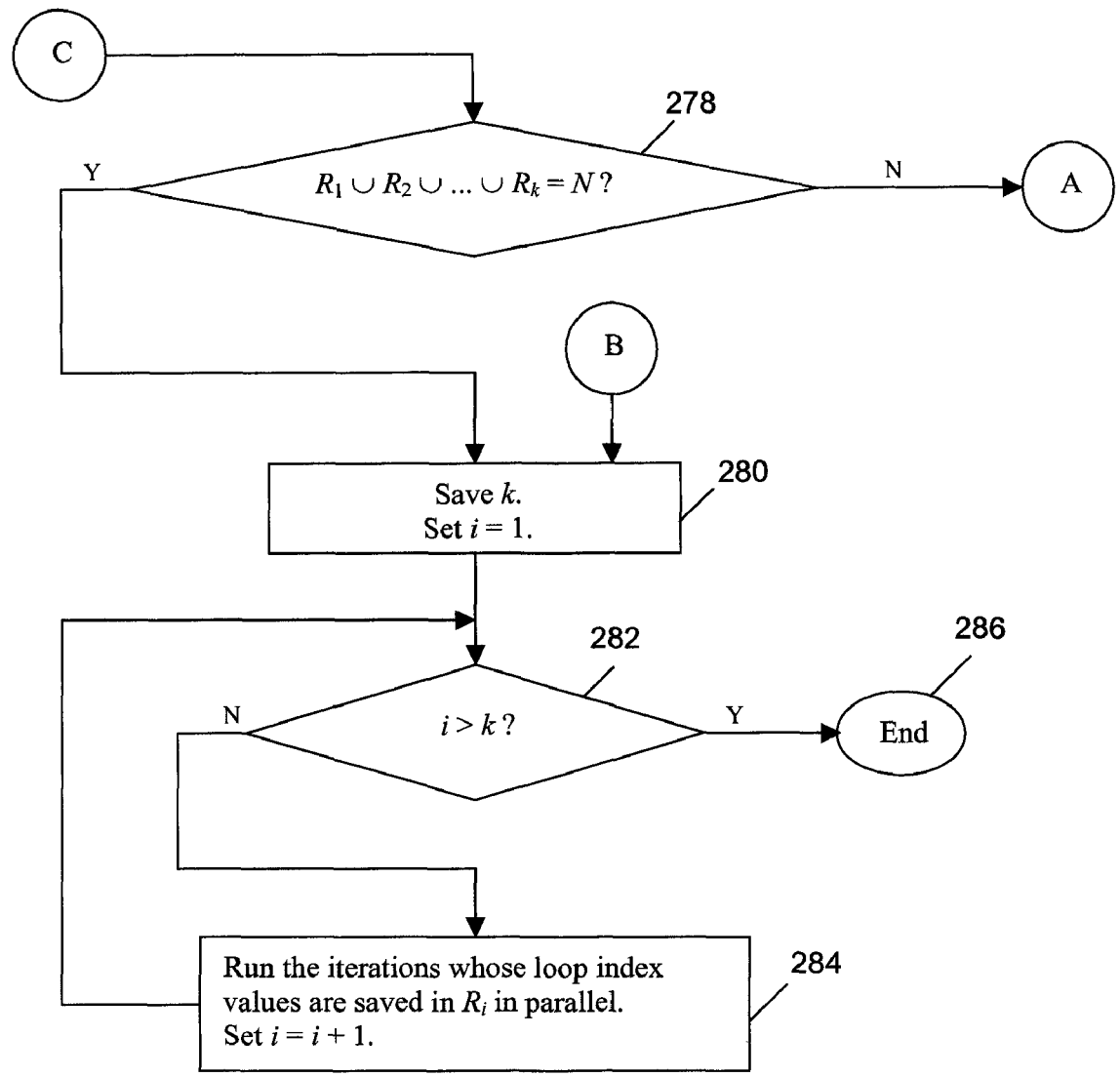

FIGS. 2A, 2B and 2C present a flow chart of steps that outline, in greater detail, steps involved in performing run-time parallelization as described above. The flow charts are easy to understand if reference is made to Table 10 for FIG. 2A and to Table 11 for FIGS. 2B and 2C. Initially, in step 202, active variables, V, $V_T$, $V_F$ and their corresponding loop index variables I, $I_T$, $I_F$ are identified in the loop body. In this notation, the set V is assigned as the union of sets $V_T$ and $V_F$, and set I is assigned as the union of sets $I_T$ and $I_F$. Values for $N_1$, $N_2$, and $M_1$ and $M_2$ are determined, and prime numbers $p(l)$ are assigned to each value of l in the inclusive range defined by $[M_1, M_2]$.

Next, in step 204, arrays are created as defined in Equation [1] below.

$$S_A(i) = \Pi_{q \in I} p(q(i))$$

$$S_T(i) = \Pi_{q \in IT} p(q(i))$$

$$S_F(i) = \Pi_{q \in IF} p(q(i)) \qquad [1]$$

Also, k is assigned as 1, the set $R_1$ is assigned as $\{N_1\}$, and j is assigned as $N_1$. A determination is then made in step 206 whether the Boolean condition C can be evaluated. If C cannot be evaluated now, $S(j)$ is assigned as $S_A(j)$ in step 208. Otherwise, if C can be evaluated now, a determination is made in step 210 whether C is true or false.

If C is true, $S(j)$ is assigned as $S_T(j)$ in step 212. Otherwise, $S(j)$ is assigned as $S_F(j)$ in step 214. After performing steps 208, 212 or 214, a determination is made in step 216 of whether j is equal to $N_1$, or whether there has been a change in j following step 204.

If j has changed, then i is assigned as $N_1$ in step 218, and drop_j is assigned as the greatest common divisor of S(i) and S(j) less one in step 220. A determination of whether drop_j is greater than 0 is made in step 222. If drop_j is not greater than 0, then i is incremented by one in step 224, and a determination is made of whether i is equal to j in step 226.

If i is not equal to j in step 226, then processing returns to step 220, in which $drop_j$ is assigned to be the greatest common divisor of S(i) and S(j) less one. Processing proceeds directly to step 222, as described directly above. If i is equal to j in step 226, then processing proceeds directly to step 228.

If drop_j is greater than 0 in step 222, or if i equals j in step 226, then a determination is made in step 228 of whether drop_j is equal to 0. If drop_j is equal to 0, the set $R_1$ is augmented with the set {j} by a set union operation. The variable j is then incremented by 1 in step 232 If drop_j is not equal to 0 in step 228, then processing proceeds directly to step 232 in which the value of j is incremented by 1.

Once j is incremented in step 232, a determination is made in step 234 of whether the value of j is greater than the value of $N_2$. If j is not greater than $N_2$, then processing returns to step 206 to determine whether C can be evaluated, as described above. Otherwise, if j is greater than $N_2$, a determination is made of whether $R_1$ is equal to N in step 236. If $R_1$ is not equal to N in step 236, then processing proceeds to step 238: the value of k is incremented by one, and $R_k$ is assigned as {l}, where l is the smallest index in the set N less the set formed by the union of sets $R_1$ through to $R_{k-1}$. Also, j is assigned to be equal to l.

After this step 238, a determination is made of whether j is an element of the union of each of the sets $R_1$ through to $R_{k-1}$. If j is such an element in step 240, then j is incremented by one in step 242. A determination is then made in step 244 of whether the value of j is less than or equal to the value of $N_2$. If j is indeed less than or equal to the value of $N_2$ in step 244, then processing returns to step 240. Otherwise, processing proceeds to step 278, as described below, if the value of j is determined to be greater than the value of N2.

If in step 240, j is determined to be not such an element, then a determination is made in step 246 of whether the Boolean condition C can be evaluated. If C cannot be evaluated in step 246, then S(j) is assigned as $S_A(j)$.

If, however, C can be evaluated, then in step 250 a determination is made of whether C is true or false. If C is true, S(j) is assigned as $S_T(j)$ in step 252, otherwise S(j) is assigned as $S_F(j)$ in step 254.

After performing either of steps 248, 252, or 254 as described above, a determination is made in step 256 of whether j is equal to l, namely whether there has been a change in j following step 238.

If the value of j is not equal to l, then the value of i is assigned as l in step 258. Following step 258, a determination is made in step 260 of whether i is an element of the union of sets $R_1$ through to $R_{k-1}$. If i is not an element, then drop_j is assigned to be the greatest common divisor of S(i) and S(j), less one, in step 262. Then a determination is made in step 264 of whether drop_j is greater than zero. If drop_j is not greater than zero, then the value of i is incremented by one in step 266. Then a determination is made in step 268 of whether the value of i is equal to the value of j in step 268. If the values of i and j are not equal in step 268, then processing returns to step 260 as described above.

If, however, the values of i and j are equal in step 268, then a determination is made in step 270 of whether drop_j is equal to zero. If drop_j is equal to zero in step 270, then the set $R_k$ is augmented by the set {j} using a union operator. If drop_j is not equal to zero in step 270, then the value of j is incremented by one in step 274. The value of j is also incremented by one in step 274 directly after performing step 272, or after performing step 256, if the value of j is found to equal the value of l.

After incrementing the value of j in step 274, a determination is made in step 276 of whether the value of j is greater than the value of $N_2$. If the value of j is not greater than the value of $N_2$, then processing returns to step 240, as described above. Otherwise, if the value of j is greater than the value of $N_2$, then processing proceeds to step 278. Step 278 is also performed if the value of j is determined to be greater than $N_2$ in step 244, as described above.

In step 278, a determination is made of whether the set N is equal to the union of sets $R_1$ through to $R_k$. If there is no equality between these two sets in step 278, then processing returns to step 238, as described above. Otherwise, if the two sets are determined to be equal in step 278, then step 280 is performed, in which the value of k is saved, and the value of i is assigned as a value of one. Step 280 is also performed following step 236, if set N is determined to equal set $R_1$.

Following step 280, a determination is made in step 282 of whether the value of i is greater than the value of k. If the value of i is greater than the value of k in step 282, then processing stops in step 286. Otherwise, if the value of i is less than or equal to the value of k in step 282, then step 284 is performed in which iterations are executed in parallel for loop index values that are saved in the set $R_i$. The value of i is also incremented by one, and processing then returns to step 282 as described above.

EXAMPLE 1

A first example is described with reference to the code fragment of Table 12 below.

TABLE 12

```
do i = 5, 9
    x1[t(i)] = x2[r(i)]
    if (t(i) > 2)    x2[u(i)] = x1[v(i)]
    else             x2[u(i)] = x1[t(i)]
enddo
```

In Table 12 above, since x1 and x2 are the only active array variables, the indirect loop index variables r(i), t(i), u(i), v(i) associated with these variables are the only index variables that are considered. The values of r(i), t(i), u(i), v(i) are provided in Table 13 below.

TABLE 13

| Indirect index variable | i = 5 | i = 6 | i = 7 | i = 8 | i = 9 |
|---|---|---|---|---|---|
| r(i) | 1 | 2 | 3 | 4 | 4 |
| t(i) | 1 | 2 | 2 | 1 | 4 |
| u(i) | 1 | 2 | 2 | 4 | 1 |
| v(i) | 1 | 2 | 3 | 1 | 1 |

By inspection, $M_1=1$, $M_2=4$, and $N_1=5$, $N_2=9$. A unique prime number is associated with each of the values 1, 2, 3, 4 that one or more of the indirect index variables can attain: p(1)=3, p(2)=5, p(3)=7, p(4)=11.

The pseudocode in Table 14 below illustrates the operations that are performed with reference to steps 1 to 5 described above in the subsection entitled "Loop parallelization procedure".

TABLE 14

Step 1
$S_A(i) = S_T(i) = p(r(i)) \times p(t(i)) \times p(u(i)) \times p(v(i))$ for i = 5, 6, 7, 8, 9.
$S_A(5) = S_T(5) = p(1) \times p(1) \times p(1) \times p(1) = 3 \times 3 \times 3 \times 3 = 81$
$S_A(6) = S_T(6) = p(2) \times p(2) \times p(2) \times p(2) = 5 \times 5 \times 5 \times 5 = 625$
$S_A(7) = S_T(7) = p(3) \times p(2) \times p(2) \times p(3) = 7 \times 5 \times 5 \times 7 = 1225$
$S_A(8) = S_T(8) = p(4) \times p(1) \times p(4) \times p(1) = 11 \times 3 \times 11 \times 3 = 1089$
$S_A(9) = S_T(9) = p(4) \times p(4) \times p(1) \times p(1) = 11 \times 11 \times 3 \times 3 = 1089$
$S_F(i) = p(r(i)) \times p(t(i)) \times p(u(i))$ for i = 5, 6, 7, 8, 9.
$S_F(5) = p(1) \times p(1) \times p(1) = 3 \times 3 \times 3 = 27$
$S_F(6) = p(2) \times p(2) \times p(2) = 5 \times 5 \times 5 = 125$
$S_F(7) = p(3) \times p(2) \times p(2) = 7 \times 5 \times 5 = 175$
$S_F(8) = p(4) \times p(1) \times p(4) = 11 \times 3 \times 11 = 363$
$S_F(9) = p(4) \times p(4) \times p(1) = 11 \times 11 \times 3 = 363$
Step 2
Set k = 1, $R_1$ = {5}.
j = 5:
   if cond = FALSE; $S(5) = S_F(5) = 27$;
j = 6:
   if cond = FALSE; $S(6) = S_F(6) = 125$;
   i = 5: GCD(27, 125) = 1;
$R_1$ = {5, 6}
j = 7:
   if cond = FALSE; $S(7) = S_F(7) = 175$;
   i = 5: GCD(27, 175) = 1;
   i = 6: GCD(125, 175) ≠ 1; terminate loop
$R_1$ = {5, 6}
j = 8:
   if cond = FALSE; $S(8) = S_F(8) = 363$;
   i = 5: GCD(27, 363) ≠ 1; terminate loop
$R_1$ = {5, 6}
j = 9:
   if cond = TRUE; $S(9) = S_T(9) = 1089$;
   i = 5: GCD(27, 1089) ≠ 1; terminate loop
$R_1$ = {5, 6}
Since $R_1 \ne N$, go to step 3.
Step 3
Set k = 2, l = 7, $R_2$ = {7}.
j = 7:
   j ∉ $R_1$;
   if cond = FALSE; $S(7) = S_F(7) = 175$;
j = 8:
   j ∉ $R_1$;
   if cond = FALSE; $S(8) S_F(8) = 363$;
   i = 7: i ∉ $R_1$; GCD(175, 363) = 1;
$R_2$ = {7, 8}
j = 9:
   j ∉ $R_1$;
   if cond = TRUE; $S(9) = S_T(9) = 1089$;
   i = 7: i ∉ $R_1$; GCD(175, 1089) = 1;
   i = 8: i ∉ $R_1$; GCD(363, 1089) ≠ 1; terminate loop
$R_2$ = {7, 8}
Since $R_1 \cup R_2 \ne N$, repeat step 3.
Set k = 3, l = 9, $R_3$ = {9}.
j = 9:
   j ∉ ($R_1 \cup R_2$);
   if cond = TRUE; $S(9) = S_T(9) = 1089$;
   No further iterations.
$R_3$ = {9}
Since $R_1 \cup R_2 \cup R_3 = N$, go to step 4.
Steps 4 and 5
Execute as outlined in steps 4 and 5 in the subsection entitled "Loop parallelization procedure". Notice that there are 5 iterations and 3 waves:
$R_1$ = {5, 6}, $R_2$ = {7, 8}, $R_3$ = {9}.

EXAMPLE 2

A second example is described with reference to the code fragment of Table 15 below.

TABLE 15

```
do i = 5, 9
    x1[t(i)] = x2[r(i)] + . . .
    if (x1[t(i)] > 0)   x2[u(i)] = x1[v(i)] + . . .
    else                x2[u(i)] = x1[t(i)] + . . .
enddo
```

In the example of Table 15 above, since x1, x2 are the only active array variables, the indirect loop index variables r(i), t(i), u(i), v(i) associated with these variables are the index variables that are considered for parallelization. Values of r(i), t(i), u(i), (i) are tabulated in Table 16 below.

TABLE 16

| Indirect index variable | i = 5 | i = 6 | i = 7 | i = 8 | i = 9 |
|---|---|---|---|---|---|
| r(i) | 1 | 2 | 3 | 4 | 4 |
| t(i) | 1 | 2 | 2 | 1 | 4 |
| u(i) | 1 | 2 | 2 | 4 | 1 |
| v(i) | 1 | 2 | 3 | 3 | 1 |

By inspection, M=1, $M_2$=4, and $N_1$=5, $N_2$=9. A unique prime number is associated with each of the values 1, 2, 3, 4 that one or more of the indirect index variables attains: p(1)=3, p(2)=5, p(3)=7, p(4)=11. That is, p( ) simply provides consecutive prime numbers, though any alternative sequence of prime numbers can also be used. The pseudocode in Table 17 below illustrates the operations that are performed with reference to steps 1 to 5 described above in the subsection entitled "Loop parallelization procedure".

TABLE 17

Step 1
$S_A(i) = S_T(i) = p(r(i)) \times p(t(i)) \times p(u(i)) \times p(v(i))$ for i = 5, 6, 7, 8, 9.
$S_A(5) = S_T(5) = p(1) \times p(1) \times p(1) \times p(1) = 3 \times 3 \times 3 \times 3 = 81$
$S_A(6) = S_T(6) = p(2) \times p(2) \times p(2) \times p(2) = 5 \times 5 \times 5 \times 5 = 625$
$S_A(7) = S_T(7) = p(3) \times p(2) \times p(2) \times p(3) = 7 \times 5 \times 5 \times 7 = 1225$
$S_A(8) = S_T(8) = p(4) \times p(1) \times p(4) \times p(3) = 11 \times 3 \times 11 \times 7 = 2541$
$S_A(9) = S_T(9) = p(4) \times p(4) \times p(1) \times p(1) = 11 \times 11 \times 3 \times 3 = 1089$
$S_F(i) = p(r(i)) \times p(t(i)) \times p(u(i))$ for i = 5, 6, 7, 8, 9.
$S_F(5) = p(1) \times p(1) \times p(1) = 3 \times 3 \times 3 = 27$
$S_F(6) = p(2) \times p(2) \times p(2) = 5 \times 5 \times 5 = 125$
$S_F(7) = p(3) \times p(2) \times p(2) = 7 \times 5 \times 5 = 175$
$S_F(8) = p(4) \times p(1) \times p(4) = 11 \times 3 \times 11 = 363$
$S_F(9) = p(4) \times p(4) \times p(1) = 11 \times 11 \times 3 = 363$
Step 2
Set k = 1, $R_1$ = {5}.
j = 5;
if cond cannot be evaluated; $S(5) = S_A(5) = 81$;
j = 6:
   if cond cannot be evaluated; $S(6) = S_A(6) = 625$;
   i = 5: GCD(81, 625) = 1;
$R_1$ = {5, 6}
j = 7:
   if cond cannot be evaluated; $S(7) = S_A(7) = 1225$;
   i = 5: GCD(81, 1225) = 1;
   i = 6: GCD(625, 1225) ≠ 1; terminate loop
$R_1$ = {5, 6}
j = 8:
   if cond cannot be evaluated; $S(8) = S_A(8) = 2541$;
   i = 5: GCD(81, 2541) ≠ 1; terminate loop
$R_1$ = {5, 6}
j = 9:
   if cond cannot be evaluated; $S(9) = S_A(9) = 1089$;
   i = 5: GCD(81, 1089) ≠ 1; terminate loop TABLE 17-continued $R_1 = \{5, 6\}$
Since $R_1 \neq N$, go to step 3.
Step 3
Set $k = 2, l = 7, R_2 = \{7\}$.
$j = 7$:
  $j \notin R_1$;
  if cond cannot be evaluated; $S(7) = S_A(7) = 1225$;
$j = 8$:
  $j \notin R_1$;
  if cond cannot be evaluated; $S(8) = S_A(8) = 2541$;
  $i = 7$: $i \notin R_1$; $GCD(1225, 2541) \neq 1$; terminate loop
$R_2 = \{7\}$
$j = 9$:
  $j \notin R_1$;
  if cond cannot be evaluated; $S(9) = S_A(9) = 1089$;
  $i = 7$: $i \notin R_1$; $GCD(1225, 1089) = 1$;
  $i = 8$: $i \notin R_1$; $GCD(2541, 1089) = 1$; terminate loop
$R_2 = \{7\}$
Since $R_1 \cup R_2 \neq N$, repeat step 3.
Set $k = 3, l = 8, R_3 = \{8\}$.
$j = 8$:
  $j \notin (R_1 \cup R_2)$;
  if cond cannot be evaluated; $S(8) = S_A(8) = 2541$;
$j = 9$:
  $j \notin (R_1 \cup R_2)$;
  if cond cannot be evaluated; $S(9) = S_A(9) = 1089$;
  $i = 8$: $i \notin (R_1 \cup R_2)$; $GCD(2541, 1089) \neq 1$; terminate loop
$R_3 = \{8\}$
Set $k = 4, l = 9, R_4 = \{9\}$.
$j = 9$:
  $j \notin (R_1 \cup R_2 \cup R_3)$;
  if cond cannot be evaluated; $S(9) = S_A(9) = 1089$;
  No further iterations.
$R_4 = \{9\}$
Since $R_1 \cup R_2 \cup R_3 \cup R_4 = N$, go to step 4.
Steps 4 and 5
Execute as outlined in steps 4 and 5 in the subsection entitled "Loop parallelization procedure". Notice that in this example there are 5 iterations and 4 waves: $R_1 = \{5, 6\}, R_2 = \{7\}, R_3 = \{8\}, R_4 = \{9\}$.

EXAMPLE 3

A third example is described with reference to the code fragment of Table 18 below.

TABLE 18

```
do i = 5, 9
  x1[t(i)] = x2[r(i)] + . . .
  if (x1[t(i)] > 0 || t(i) > 2)   x2[u(i)] = x1[v(i)] + . . .
  else                             x2[u(i)] = x1[t(i)] + . . .
enddo
```

In the example of Table 18 above, since x1, x2 are the only active array variables, the indirect loop index variables r(i), t(i), u(i), v(i) associated with them are the index variables to be considered for parallelization.

Values of r(i), t(i), u(i), and v(i) are tabulated in Table 19 below.

TABLE 19

| Indirect index variable | i = 5 | i = 6 | i = 7 | i = 8 | i = 9 |
|---|---|---|---|---|---|
| r(i) | 1 | 2 | 3 | 4 | 4 |
| t(i) | 1 | 2 | 3 | 1 | 4 |
| u(i) | 1 | 2 | 2 | 4 | 1 |
| v(i) | 1 | 2 | 3 | 3 | 1 |

By inspection, $M_1=1$, $M_2=4$, and $N_1=5$, $N_2=9$. A unique prime number is associated with each of the values 1, 2, 3, 4 that one or more of the indirect index variables attains: $p(\mathbf{1})=3$, $p(\mathbf{2})=5$, $p(\mathbf{3})=7$, $p(\mathbf{4})=11$.

The pseudocode in Table 20 below illustrates the operations that are performed with reference to steps 1 to 5 described above in the subsection entitled "Loop parallelization procedure".

TABLE 20

Step 1
$S_A(i) = S_T(i) = p(r(i)) \times p(t(i)) \times p(u(i)) \times p(v(i))$ for $i = 5, 6, 7, 8, 9$.
$S_A(5) = S_T(5) = p(1) \times p(1) \times p(1) \times p(1) = 3 \times 3 \times 3 \times 3 = 81$
$S_A(6) = S_T(6) = p(2) \times p(2) \times p(2) \times p(2) = 5 \times 5 \times 5 \times 5 = 625$
$S_A(7) = S_T(7) = p(3) \times p(3) \times p(2) \times p(3) = 7 \times 7 \times 5 \times 7 = 1715$
$S_A(8) = S_T(8) = p(4) \times p(1) \times p(4) \times p(3) = 11 \times 3 \times 11 \times 7 = 2541$
$S_A(9) = S_T(9) = p(4) \times p(4) \times p(1) \times p(1) = 11 \times 11 \times 3 \times 3 = 1089$
$S_F(i) = p(r(i)) \times p(t(i)) \times p(u(i))$ for $i = 5, 6, 7, 8, 9$.
$S_F(5) = p(1) \times p(1) \times p(1) = 3 \times 3 \times 3 = 27$
$S_F(6) = p(2) \times p(2) \times p(2) = 5 \times 5 \times 5 = 125$
$S_F(7) = p(3) \times p(3) \times p(2) = 7 \times 7 \times 5 = 245$
$S_F(8) = p(4) \times p(1) \times p(4) = 11 \times 3 \times 11 = 363$
$S_F(9) = p(4) \times p(4) \times p(1) = 11 \times 11 \times 3 = 363$
Step 2
Set $k = 1, R_1 = \{5\}$.
$j = 5$:
  'if cond' cannot be evaluated; $S(5) = S_A(S) = 81$;
Comment: The 'if cond' cannot be evaluated since even though 't(i) > 2' is false, the 'or' operator requires that x1[t(i)] must also be evaluated to finally determine the 'if cond'. If the 'if cond' had turned out to be true, then evaluation of x1[t(i)] would not have been necessary in view of the 'or' operator.
$j = 6$:
  'if cond' cannot be evaluated; $S(6) = S_A(6) = 625$;
  $i = 5$: $GCD(81, 625) = 1$;
$R_1 = \{5, 6\}$
$j = 7$:
  if cond = TRUE; $S(7) = S_T(7) = 1715$;
Comment: The 'if cond' is true because 't(i) > 2' is true. Therefore x1[t(i)] need not be evaluated in the presence of the 'or' operator.
  $i = 5$: $GCD(81, 1715) = 1$;
  $i = 6$: $GCD(625, 1715) \neq 1$; terminate loop
$R_1 = \{5, 6\}$
$j = 8$:
  'if cond' cannot be evaluated; $S(8) = S_A(8) = 2541$;
  $i = 5$: $GCD(81, 2541) \neq 1$; terminate loop
$R_1 = \{5, 6\}$
$j = 9$:
  'if cond' = TRUE; $S(9) = S_T(9) = 1089$;
Comment: The 'if cond' is true because 't(i) > 2' is true. Therefore x1[t(i)] need not be evaluated in the presence of the 'or' operator.
  $i = 5$: $GCD(81, 1089) \neq 1$; terminate loop
$R_1 = \{5, 6\}$
Since $R_1 \neq N$, goto step 3.
Step 3
Set $k = 2, l = 7, R_2 = \{7\}$.
$j = 7$:
  $j \notin R_1$;
  'if cond' = TRUE; $S(7) = S_T(7) = 1715$;
$j = 8$:
  $j \notin R_1$;
  'if cond' cannot be evaluated; $S(8) = S_A(8) = 2541$;
  $i = 7$: $i \notin R_1$; $GCD(1715, 2541) \neq 1$; terminate loop
$R_2 = \{7\}$
$j = 9$:
  $j \notin R_1$;
  'if cond' = TRUE; $S(9) = S_T(9) = 1089$;
  $i = 7$: $i \notin R_1$; $GCD(1715, 1089) + 1$;
  $i = 8$: $i \notin R_1$; $GCD(2541, 1089) \neq 1$; terminate loop
$R_2 = \{7\}$
Since $R_1 \cup R_2 \neq N$, repeat step 3.
Set $k = 3, l = 8, R_3 \{8\}$.
$j = 8$:
  $j \notin (R_1 \cup R_2)$;
  'if cond' cannot be evaluated; $S(8) S_A(8) = 2541$;

TABLE 20-continued j = 9:
   j ∉ (R$_1$ ∪ R$_2$);
     'if cond' = TRUE; S(9) = S$_T$(9) = 1089;
     i = 8: i ∉ (R$_1$ ∪ R$_2$); GCD(2541, 1089) ≠ 1; terminate loop
R$_3$ = {8}
Set k = 4, l = 9, R$_4$ = {9}.
j = 9:
   j ∉ (R$_1$ ∪ R$_2$ ∪ R$_3$);
     'if cond' = TRUE; S(9) = S$_T$(9) = 1089;
     No further iterations.
R$_4$ = {9}
Since R$_1$ ∪ R$_2$ ∪ R$_3$ = R$_4$ = N, go to step 4.
Steps 4 and 5
Execute as outlined in steps 4 and 5 in the subsection entitled "Loop parallelization procedure". Notice that in this example too there are 5 iterations and 4 waves: R$_1$ = {5, 6}, R$_2$ = {7}, R$_3$ = {8}, R$_4$ = {9}.

Case when no Conditional Statements are Present in the Loop

In this case put V=V$_A$, I=I$_A$, S=S$_A$. Since there is no conditional statement C in the loop, the statement "if (C cannot be evaluated now) . . . ", wherever it appears in the loop parallelization algorithm described above, is assumed to evaluate to "true".

Extension of the Method to Include Multiple Boolean Conditions

Inclusion of more than one Boolean condition in a loop body increases the number of decision paths (to a maximum of $3^r$, where r is the number of Boolean conditions) available in a loop. The factor 3 appears because each condition may have one of three states: true, false, not decidable, even though the condition is Boolean. For each path λ, it is necessary to compute an S$_λ$(i) value for each iteration i. This is done by modifying the code fragment shown in Table 21 which appears in steps 2 and 3 of the "Loop parallelization procedure" described above.

TABLE 21 if (C is not decidable) S(j) = S$_A$(j)
else {
   if (C) S(j) = S$_T$(j)
   else S(j) = S$_F$(j)
}

The modification replaces the code fragment by if (λ=path(i)) S(i)=S$_λ$(i)

where the function path(i) evaluates the Boolean conditions in the path and returns a path index λ. The enumeration of all possible paths, for each loop in a program, can be done by a compiler and the information provided to the run-time system in an appropriate format. Typically, each Boolean condition is provided with a unique identifier, which is then used in constructing the paths. When such an identifier appears in a path it is also tagged with one of three states, say, T (for true), F (for false), A (for not decidable, that is, carry all active array variables) as applicable for the path. A suggested path format is the following string representation ident_1:X_1 ident_2:X_2 . . . ident_n:X_n;, where ident_i identifies a Boolean condition in a loop and x_i one of its possible state T, F, or A. Finally, this string is appended with the list of indirect loop index variables that appear with the active variables in the path. A suggested format is ident_1:X_1 ident_2:X_2 . . . ident_n:X_n; {I$_λ$}, where {I$_λ$} comprises the set of indirect loop index variables (any two variables being separated by a comma), and the construction of any of ident_n, x_n, or elements of the set {I$_λ$} do not use the delimiter characters ':', ';' or ','. The left-to-right sequence in which the identifiers appear in a path string corresponds to the sequence in which the Boolean conditions will be encountered in the path at run-time. Let Q={q$_1$, q$_2$, . . . , q$_m$} be the set of m appended path strings found by a compiler. A typical appended path string q$_λ$ in Q may appear as q$_λ$=id4:T id7:T id6:F id8:T; {u, r, t}, where the path portion represents the execution sequence wherein the Boolean condition with the identifier id4 evaluates to true, id7 evaluates to true, id6 evaluates to false, id8 evaluates to true, and the path has the indirect loop index variables {u, r, t} associated with its active variables.

With the formatted set Q of all possible appended path strings available from a compiler, the run-time system then needs only to construct a path q for each iteration being considered in a wave, compare q with the paths in Q, and decide upon the parallelizing options available to it.

The simplest type of path the run-time system can construct is one for which each Boolean condition, in the sequence of Boolean conditions being evaluated in an iteration, evaluates to either true or false. In such a case, the exact path in the iteration is known. Let q be such a path, which in the suggested format appears as q=ident_1:X_1 ident_2:X_2 . . . ident_n:X_n;.

A string match with the set of strings available in Q will show that q will appear as a path in one and only one of the strings in Q (since q was cleverly formatted to end with the character ';' which does not appear in any other part of the string), say, q$_λ$ and the function path(i) will return the index λ on finding this match. The set of indirect loop index variables {I$_λ$} can be plucked from the trailing part of q$_λ$ for calculating S$_λ$(i).

When the run-time system, while constructing a path q, comes across a Boolean condition that evaluates to not decidable, it means that a definite path cannot be determined before executing the iteration. In such a case, the construction of the path is terminated at the undecidable Boolean condition encountered after encoding the Boolean condition and its state (A) into the path string. For example, let this undecidable Boolean condition have the identifier idr, then the path q would terminate with the substring idr:A;. A variation of q is now constructed which is identical to q except that the character ';' is replaced by the blank character ' '. Let q' be this variation. All the strings in Q for which either q or q' is an initial substring (meaning that q will appear as a substring from the head of whatever string in Q it matches with) is a possible path for the iteration under consideration. (There will be more than one such path found in Q.) In such a case the path( ) function will return an illegal λ value (in this embodiment it is −1) and S$_λ$(i) is computed using the set of indirect index variables given by the union of all the indirect index variable sets that appear in the paths in Q for which either of q or q' was found to be an initial substring. Note that S$_{-1}$(i) does not have a unique value (unlike the other S$_λ$(i)s which could be precalculated and saved) but must be calculated afresh every time path(i) returns −1.

Nested Indexing of Indirect Index Variables

The case in which one or more of the indirect index variables, for example, i$_k$, is further indirectly indexed as i$_k$(l) where l(i), in turn, is indirectly indexed to i, is handled by treating i$_k$(l) as another indirect index variable, for example, it(i). Indeed, l, instead of being an array can be any function of i.

Use of Bit Vectors Instead of Prime Numbers

Instead of defining $S_\lambda(i)$, where $\lambda$ is a decision path in the loop, in terms of the product of prime numbers, one may use a binary bit vector. Here one associates a binary bit, in place of a prime number, for each number in the range $[M_1, M_2]$. That is, the k-th bit of a bit vector $S_\lambda(i)$ when set to 1 denotes the presence of the prime number $p(k)$ in $S_{80}(i)$. This can be achieved by performing a logical OR operation of each of the unique bit patterns associated with each of the values of the indirect loop index variables for the iteration. The existence of cross-iteration dependencies is determined by determining whether the indirectly indexed access pattern for the two iterations, namely bit vectors $S_\alpha(i)$ and $S_\beta(j)$, have any common bit positions that share a value of one. If a logical AND operation between any two bit vectors $S_\alpha(i)$ and $S_\beta(j)$ produces a null bit vector, then the decision paths corresponding to $S(i)$ and $S_\beta(j)$ do not share common values of the indirect index variables. This is equivalent to the expression $GCD(S_\alpha(i), S_\beta(j))=1$ described above. If a logical AND operation between any two bit vectors $S_\alpha(i)$ and $S_\beta(j)$ does not produce a null bit vector, then there are common bit positions that share a value of one. This is equivalent to the expression $GCD(S_\alpha(i), S_\beta(j)) \neq 1$.

Computer Hardware and Software

Figure 3:
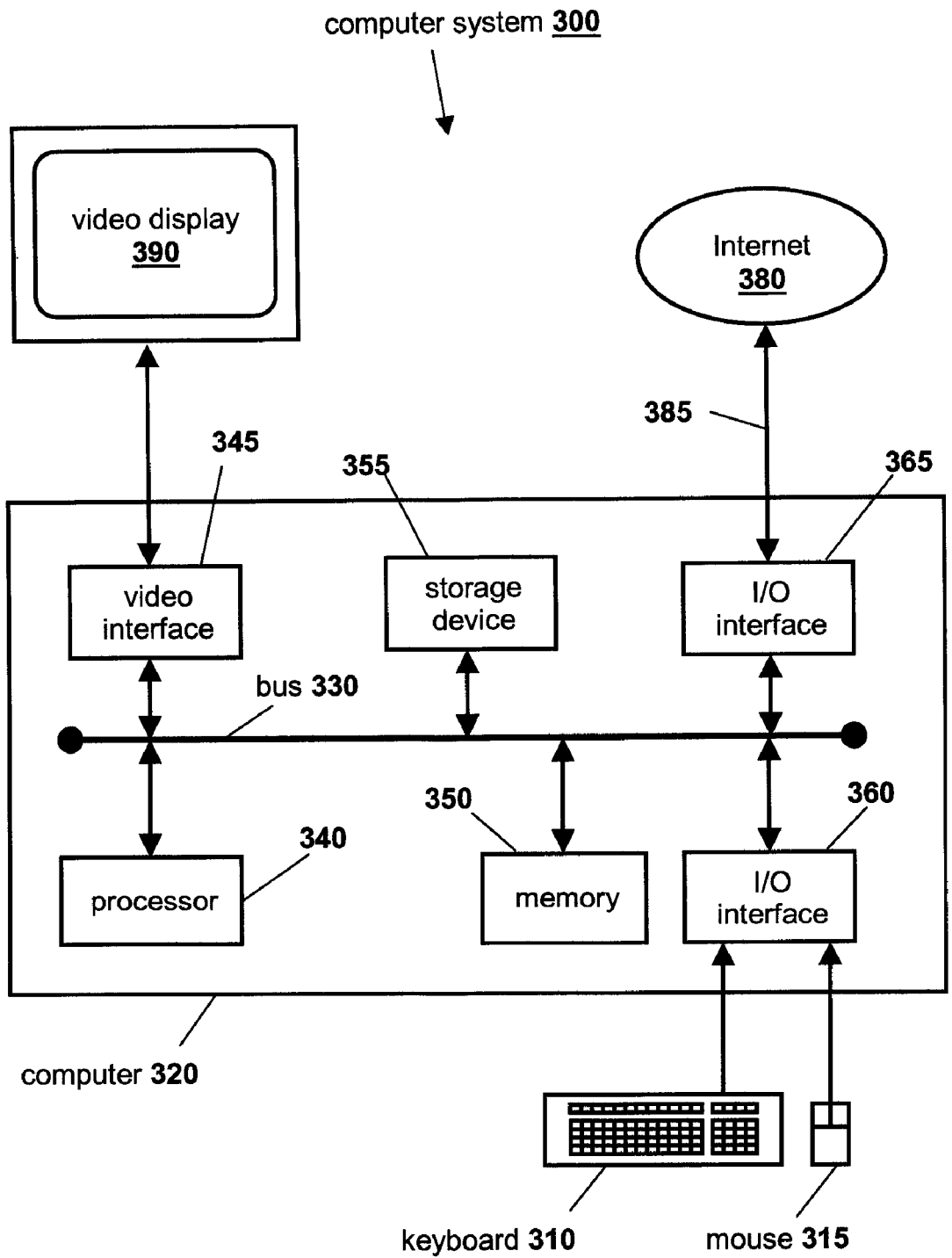
FIG. 3 is a schematic representation of a computer system suitable for performing the run-time parallelization techniques described herein.

FIG. 3 is a schematic representation of a computer system 300 that is provided for executing computer software programmed to assist in performing run-time parallelization of loops as described herein. This computer software executes on the computer system 300 under a suitable operating system installed on the computer system 300.

The computer software is based upon computer program comprising a set of programmed instructions that are able to be interpreted by the computer system 300 for instructing the computer system 300 to perform predetermined functions specified by those instructions. The computer program can be an expression recorded in any suitable programming language comprising a set of instructions intended to cause a suitable computer system to perform particular functions, either directly or after conversion to another programming language.

The computer software is programmed using statements in an appropriate computer programming language. The computer program is processed, using a compiler, into computer software that has a binary format suitable for execution by the operating system. The computer software is programmed in a manner that involves various software components, or code means, that perform particular steps in accordance with the techniques described herein.

The components of the computer system 300 include: a computer 320, input devices 310, 315 and video display 390. The computer 320 includes: processor 340, memory module 350, input/output (I/O) interfaces 360, 365, video interface 345, and storage device 355. The computer system 300 can be connected to one or more other similar computers, using a input/output (I/O) interface 365, via a communication channel 385 to a network 380, represented as the Internet.

The processor 340 is a central processing unit (CPU) that executes the operating system and the computer software executing under the operating system. The memory module 350 includes random access memory (RAM) and read-only memory (ROM), and is used under direction of the processor 340.

The video interface 345 is connected to video display 390 and provides video signals for display on the video display 390. User input to operate the computer 320 is provided from input devices 310, 315 consisting of keyboard 310 and mouse 315. The storage device 355 can include a disk drive or any other suitable non-volatile storage medium. Each of the components of the computer 320 is connected to a bus 330 that includes data, address, and control buses, to allow these components to communicate with each other via the bus 330.

The computer software can be provided as a computer program product recorded on a portable storage medium. In this case, the computer software is accessed by the computer system 300 from the storage device 355. Alternatively, the computer software can be accessed directly from the network 380 by the computer 320. In either case, a user can interact with the computer system 300 using the keyboard 310 and mouse 315 to operate the computer software executing on the computer 320.

The computer system 300 is described only as an example for illustrative purposes. Other configurations or types of computer systems can be equally well used to implement the described techniques.

Various alterations and modifications can be made to the techniques and arrangements described herein, as would be apparent to one skilled in the relevant art.

CONCLUSION

Techniques and arrangements are described herein for performing run-time parallelization of loops in computer programs having indirect loop index variables and embedded conditional variables. Various alterations and modifications can be made to the techniques and arrangements described herein, as would be apparent to one skilled in the relevant art.

We claim:

1. A method for executing, by a processor of a computer system, a set of program instructions for a loop, wherein the method comprises:

associating a unique proxy value with each indirect loop index variable of the loop, wherein each unique proxy value is a proxy value bit vector, each proxy value bit vector representing a different prime number;

calculating, for each iteration of the loop, an indirectly indexed access pattern based upon the unique values;

determining whether cross-iteration dependencies exist between any two iterations of the loop based upon the indirectly indexed access patterns of the two iterations;

scheduling the program instructions of the loop across iterations into waves based on the cross-iteration dependencies found; and executing the waves.

2. The method of claim 1, wherein the indirectly indexed access pattern for each iteration is calculated as an indirectly indexed access pattern bit vector by OR'ing the proxy value bit vectors associated with the respective indirect loop index variables on a decision path of the loop for that iteration.

3. The method of claim 2, wherein the determining of cross-iteration dependencies is calculated as an AND'ing result of two indirectly indexed access pattern bit vectors for two respective iterations, wherein a null bit vector of the AND'ing result indicates that no dependencies exist between the two respective iterations.

4. The method of claim 2, wherein an indirect indexed access pattern is calculated for each possible decision path of the loop.

5. The method of claim 1, wherein the indirectly indexed access patterns for the respective iterations of the loop have pattern values, and wherein for each iteration the pattern values of the indirectly indexed access pattern do not exceed three in number regardless of how many statements are in the loop.

6. The method of claim 1, wherein a set of n prime numbers are enumerated in a series such that one of the prime numbers may be referred to as a kth number of the series, and wherein each proxy value bit vector has n bits having respective logic states and represents a prime number by the logic state of the kth one of the n bits.

7. A computer program product for executing, by a processor of a computer system, a set of program instructions for a loop, the computer program product comprising computer software stored on a tangible, computer-readable storage medium for performing:
    associating a unique proxy value with each indirect loop index variable of the loop, wherein each unique proxy value is a proxy value bit vector, each proxy value bit vector representing a different prime number;
    calculating, for each iteration of the loop, an indirectly indexed access pattern based upon the unique values;
    determining whether cross-iteration dependencies exist between any two iterations of the loop based upon the indirectly indexed access patterns of the two iterations;
    scheduling the program instructions of the loop across iterations into waves based on the cross-iteration dependencies found; and
    executing the waves.

8. The computer program product of claim 7, wherein the indirectly indexed access pattern for each iteration is calculated as an indirectly indexed access pattern bit vector by OR'ing the proxy value bit vectors associated with the respective indirect loop index variables on a decision path of the loop for that iteration.

9. The computer program product of claim 8, wherein the determining of cross-iteration dependencies is calculated as an AND'ing result of two indirectly indexed access pattern bit vectors for two respective iterations, wherein a null bit vector of the AND'ing result indicates that no dependencies exist between the two respective iterations.

10. The computer program product of claim 8, wherein an indirect indexed access pattern is calculated for each possible decision path of the loop.

11. The computer program product of claim 7, the indirectly indexed access patterns for the respective iterations of the loop have pattern values, and wherein for each iteration the pattern values of the indirectly indexed access pattern do not exceed three in number regardless of how many statements are in the loop.

12. The computer program product of claim 7, wherein a set of n prime numbers are enumerated in a series such that one of the prime numbers may be referred to as a kth number of the series, and wherein each proxy value bit vector has n bits having respective logic states and represents a prime number by the logic state of the kth one of the n bits.

13. A computer system having program instructions stored on a computer-readable medium for executing, by a processor of the computer system, a set of the program instructions for a loop, wherein the executing comprises performing:
    associating a unique proxy value with each indirect loop index variable of the loop, wherein each unique proxy value is a proxy value bit vector, each proxy value bit vector representing a different prime number;
    calculating, for each iteration of the loop, an indirectly indexed access pattern based upon the unique values;
    determining whether cross-iteration dependencies exist between any two iterations of the loop based upon the indirectly indexed access patterns of the two iterations;
    scheduling the program instructions of the loop across iterations into waves based on the cross-iteration dependencies found; and
    executing the waves.

14. The computer program product of claim 13, wherein the indirectly indexed access pattern for each iteration is calculated as an indirectly indexed access pattern bit vector by OR'ing the proxy value bit vectors associated with the respective indirect loop index variables on a decision path of the loop for that iteration.

15. The computer program product of claim 14, wherein the determining of cross-iteration dependencies is calculated as an AND'ing result of two indirectly indexed access pattern bit vectors for two respective iterations, wherein a null bit vector of the AND'ing result indicates that no dependencies exist between the two respective iterations.

16. The computer program product of claim 14, wherein an indirect indexed access pattern is calculated for each possible decision path of the loop.

17. The computer program product of claim 13, wherein the indirectly indexed access patterns for the respective iterations of the loop have pattern values, and wherein for each iteration the pattern values of the indirectly indexed access pattern do not exceed three in number regardless of how many statements are in the loop.

18. The computer program product of claim 13, wherein a set of n prime numbers are enumerated in a series such that one of the prime numbers may be referred to as a kth number of the series, and wherein each proxy value bit vector has n bits having respective logic states and represents a prime number by the logic state of the kth one of the n bits.

\* \* \* \* \*